United States Patent [19]
Cassin

[11] Patent Number: 5,421,623
[45] Date of Patent: Jun. 6, 1995

[54] FRICTION SEALED COUPLING FOR PIPE

[76] Inventor: Allen E. Cassin, 1850 Day Dr., St. Clair, Mo. 63077

[21] Appl. No.: 249,534

[22] Filed: May 26, 1994

[51] Int. Cl.⁶ .......................................... F16L 17/02
[52] U.S. Cl. .................................... 285/343; 285/369; 285/382; 285/383; 285/417; 29/516; 29/520
[58] Field of Search ............... 285/368, 369, 343, 421, 285/417, 412, 337, 383, 382; 29/516, 508, 520, 507

[56] References Cited

U.S. PATENT DOCUMENTS

| | | | |
|---|---|---|---|
| 1,506,881 | 9/1924 | Broberg . | |
| 2,261,481 | 10/1940 | Wolferz | 285/343 |
| 2,374,574 | 4/1945 | Adams | 285/412 |
| 2,507,261 | 5/1950 | Mercier | 285/368 X |
| 3,149,860 | 9/1964 | Hallesy | 285/421 X |
| 3,498,648 | 3/1970 | Hallesy | 285/417 X |
| 4,201,267 | 5/1980 | Ramhorst | 166/315 |
| 4,281,856 | 8/1981 | Litman et al. | 285/383 X |
| 4,465,133 | 8/1984 | Bridges | 166/208 |
| 4,498,534 | 2/1985 | Lindsey, Jr. | 166/208 |
| 4,619,326 | 10/1986 | van Mierlo | 166/382 |
| 4,691,740 | 9/1987 | Svetlik et al. | 138/109 |
| 4,723,578 | 2/1988 | Mordarski et al. | 138/97 |
| 4,771,810 | 9/1988 | Ermold et al. | 138/89 |
| 4,862,961 | 9/1989 | Neff | 166/127 |
| 4,941,512 | 7/1990 | McParland | 138/97 |
| 4,942,924 | 7/1990 | Duncan | 166/290 |
| 4,982,763 | 1/1991 | Klahn | 138/89 |
| 5,131,632 | 7/1992 | Olson | 285/421 X |
| 5,267,612 | 12/1993 | Cassin | 166/86 |

FOREIGN PATENT DOCUMENTS

| | | | |
|---|---|---|---|
| 1175126 | 3/1959 | France | 285/368 |
| 806614 | 6/1951 | Germany | 285/412 |
| 2436112 | 2/1975 | Germany | 285/337 |

Primary Examiner—Dave W. Arola
Attorney, Agent, or Firm—Polster, Lieder, Woodruff & Lucchesi

[57] ABSTRACT

A friction sealed coupling assembly (10) for connecting sections of pipe (P1, P2) having a connecting sleeve (12) and a pair of opposed draw sleeves (14, 16). The connecting sleeve is formed of a hollow cylinder (24) having a uniform inner diameter (D2) and an outer diameter that decreases from a midpoint (M) toward each open end (26, 28) resulting in diverging external tapers (T1, T2). One of the draw sleeves is placed over each taper of the connecting sleeve, each draw sleeve having a uniform outer diameter and an inner diameter that decreases from the first end to the second end creating an inner taper. The inner wall of each draw sleeve is oppositely tapered to the corresponding connecting sleeve end. Each draw sleeve has a bolting flange formed at one end. Ends of the sections of pipe to be connected are first inserted in each end of the connecting sleeve. The opposed draw sleeves are drawn together by tightening connecting bolts (22) so the sleeves move toward each other. The tapered internal walls of the draw sleeves compress the oppositely tapered walls of the connecting sleeve until the connecting sleeve walls compress and adhere to the outside of the pipe sections.

14 Claims, 5 Drawing Sheets

FRICTION SEALED COUPLING FOR PIPE

BACKGROUND OF THE INVENTION

This invention relates generally to a coupling for connecting sections of pipe, and more particularly, to a friction sealed coupling assembly for connecting sections of pipe such as high pressure pipe.

High pressure pipe has a number of practical applications. For example, high pressure pipe is used for oil well casings, gas piping and high pressure water piping. To extend a length of such piping, or to repair a break in a section of piping, respective sections must be joined together, end-to-end. Small diameter piping can be joined by threading the outer diameter of the adjoining ends of the pipe sections and fitting a threaded sleeve onto the ends to connect the respective pipe sections. This method is not, however, practical for large diameter, high pressure pipe, such as oil well casing, large diameter water pipes or the like. Presently sections of such large diameter pipe are connected with a coupling having an internal, non-metallic cup seal or gasket intended to prevent fluid from leaking between the seal and the outside wall of the pipe. Such couplings employ a holding mechanism, such as a collar or flange, at the end of the section of pipe to be joined. Adjustment screws extend from flange to flange, for example, to draw the ends of the pipe together and position the pipe concentric to the coupling. This is an unsatisfactory procedure that relies on the seal to prevent leakage. This method can result in a relatively flexible or deformable joint that can rupture and leak when subjected to torsional forces. Furthermore, mispositioning or damage to the seal is not detected until after the pipe is pressurized. Seals or gaskets, moreover, reduce the internal diameter of the joint, thereby reducing fluid flow into through the pipe.

Joints connecting high pressure pipe sections can be welded. However, welding is labor intensive and expensive. Heavy welds can protrude into the joint, again reducing the internal diameter. Moreover, small holes in the welds may not be detected until after the pipe is pressurized. To prevent such problems, the wells are x-rayed, another time consuming and expensive procedure. Finally, welding and x-raying joints of high pressure pipe under water is time consuming, expensive, and, at times, impractical.

The present invention recognizes and solves the problems associated with connecting sections of pipe, particularly high pressured pipe. The present invention does not rely on a non-metallic seal to prevent leakage but connects the sections of pipe together by drawing the sections together inside a friction sealed steel assembly.

SUMMARY OF THE INVENTION

It is, therefore, among the several objects of the present invention to provide a friction sealed coupling assembly for sealingly connecting sections of pipe together with the inside of the coupling not requiring a non-metallic seal, and the assembly requiring no threads or welding to complete.

Another object of the invention is to provide a friction sealed coupling assembly with a connecting sleeve placed over the ends of the pipe sections to be connected, and a pair of draw sleeves, one draw sleeve being fitted over each end of the connecting sleeve, wherein the tightening of the draw sleeves causes the connecting sleeve to compress and adhere to the outside walls of the pipe sections.

A further object of the invention is to provide a friction sealed coupling assembly with a connecting sleeve manufactured out of a material sufficiently ductile to allow compression of the sleeve wall under the force of the draw sleeve.

A still further object of the invention is to provide a friction sealed coupling assembly having all of the elements of the assembly external to the pipe sections to be joined so as to not reduce the internal diameter of the pipe at the resulting joint.

Yet another object of the present invention is to provide a friction sealed coupling assembly that is simple and easy to construct, easy to use, requires no moving parts, is economical, requires little or no maintenance and is well suited for its intended purpose.

In accordance with the invention, generally stated, a friction sealed coupling assembly is provided for connecting sections of pipe. The assembly includes a connecting sleeve and a pair of draw sleeves. The connecting sleeve comprises a hollow cylinder having an inner diameter slightly larger than the outer diameter of the pipe sections to be joined. The connecting sleeve is placed over the adjacent ends of the respective pipe sections to be joined. The outer diameter of the connecting sleeve decreases from the midpoint of the sleeve toward each end of the sleeve. This results in diverging, external tapers on each end of the connecting sleeve. A cylindrical draw sleeve is placed over each tapered end of the connecting sleeve. Each draw sleeve has a uniform outer diameter and an inner wall which is oppositely tapered to the corresponding connecting sleeve end. Each draw sleeve has a bolting flange formed at one end. The respective opposed bolting flanges are connected to each other by one or more draw bolts. As the draw bolts are tightened, the respective draw sleeves are drawn toward each other. The tapered internal walls of the draw sleeves compress the oppositely tapered wall of the connecting sleeve until the connecting sleeve walls compress and adhere to the outside of the pipe, holding the assembly in a tight friction fit.

DESCRIPTION OF THE PREFERRED EMBODIMENT

Figure 1:
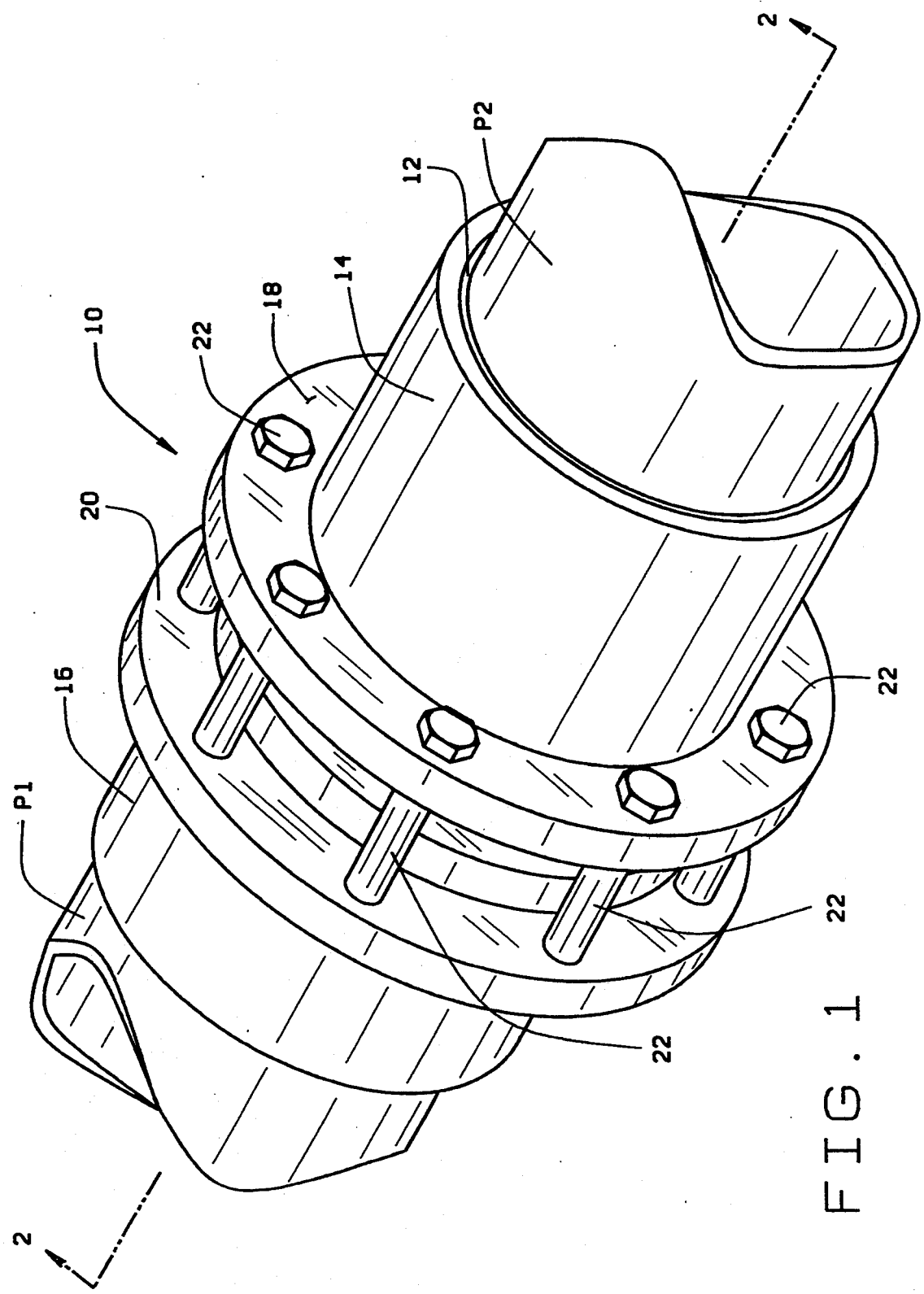
FIG. 1 is a perspective view of a friction sealed coupling assembly of the present invention, joining two sections of pipe.
Figure 2:
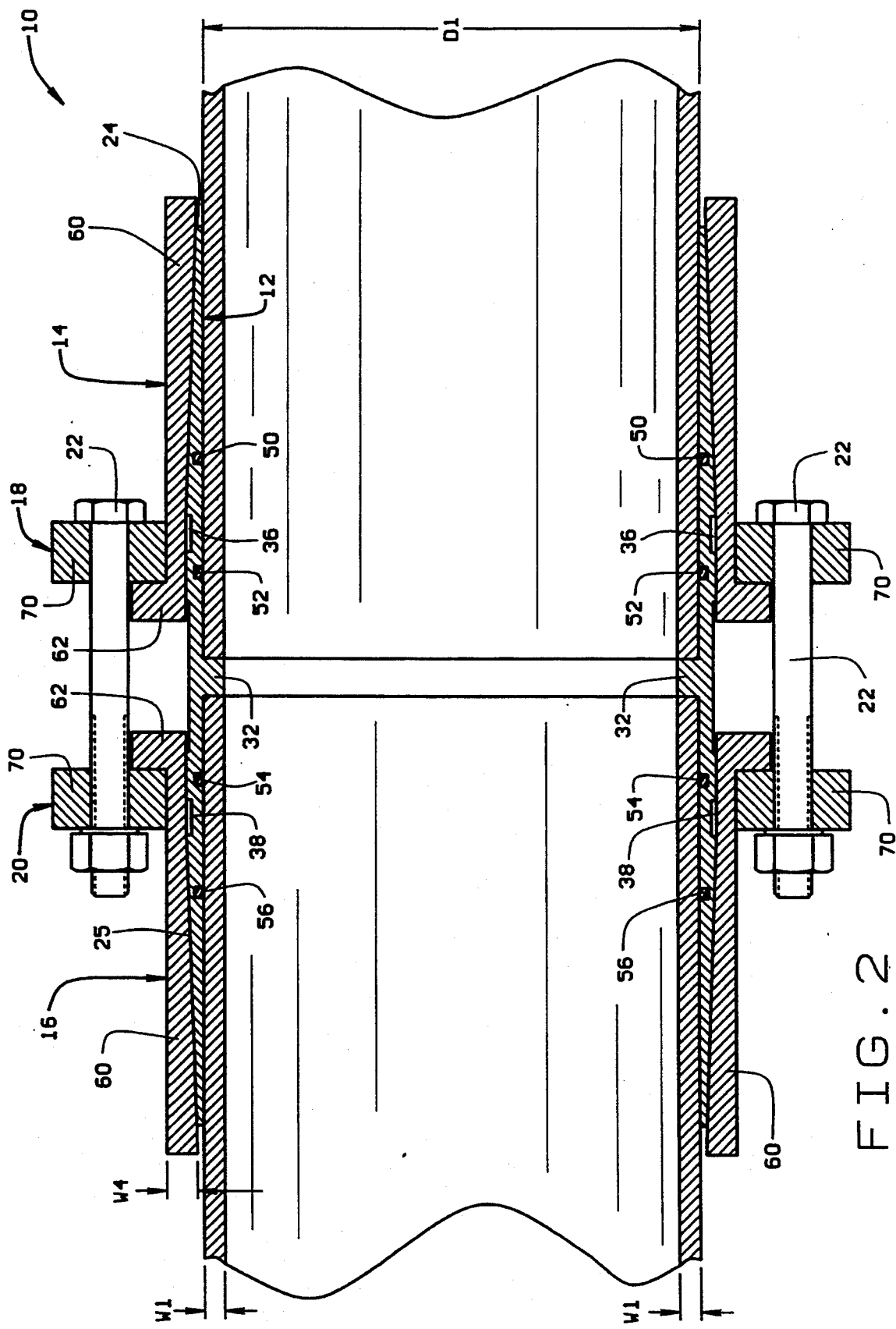
FIG. 2 is a cross-sectional view of the assembly, taken across lines 2—2 of FIG. 1.

A friction sealed coupling assembly made in accordance with the principles of the present invention is indicated by reference numeral 10 in FIGS. 1 and 2. Assembly 10 is shown joining two sections of pipe, P1 and P2, to illustrate the environment in which the assembly is used. Pipe sections P1 and P2 can be as long or as short as required by the application of the pipe. Furthermore, although the outside diameter D1 of the pipe sections may vary, the elements of assembly 10 are capable of construction in any size to accommodate various size pipe sections P1 and P2. It will be appreciated by those skilled in the art, therefore, that assembly 10 can be used to join any type or size of pipe, including flexible pipe having a hard, metallic end section. In the preferred embodiment, however, as shown and described, assembly 10 is used to join sections of large diameter, high pressure pipe such as gas pipe or oil well casing.

In the preferred embodiment, assembly 10 has an inner connecting sleeve 12, a pair of opposed draw sleeves 14 and 16, bolting flange means 18 and 20, and a plurality of draw bolts, as at 22. The individual elements of assembly 10 will now be described in greater detail.

Figure 3:
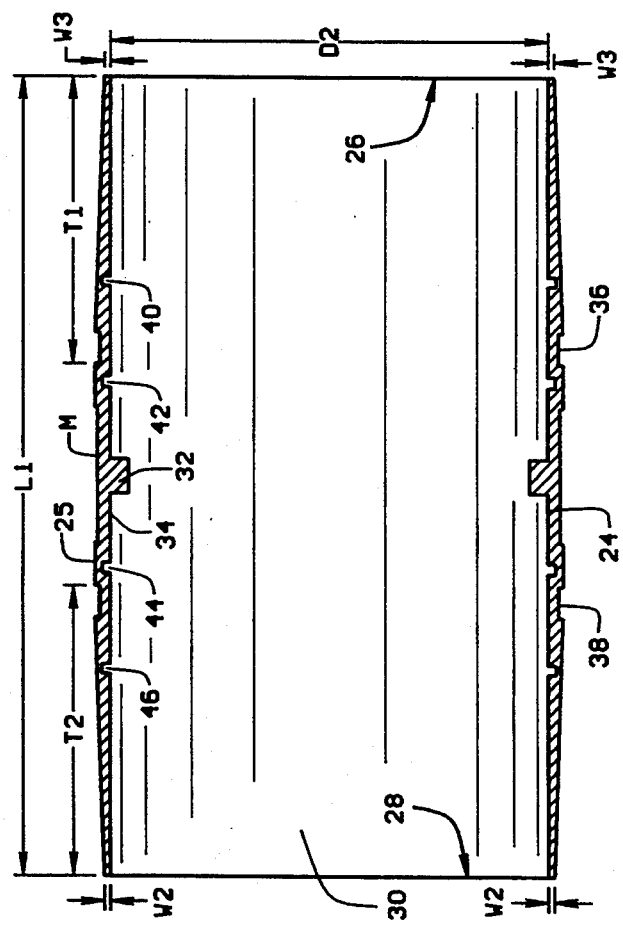
FIG. 3 is a cross-sectional view of a connecting sleeve element of the coupling assembly.

Connecting sleeve 12 is shown in greater detail in FIGS. 2 and 3. Connecting sleeve 12 is a generally elongated, tubular or hollow cylinder 24. Cylinder 24 is machined from ductile-type steel, such as 304 stainless steel. Cylinder 24 has an outer or external surface 25, a first open end 26 and a second open end 28 (see FIG. 3) as defined by an internal longitudinal bore 30. Open ends 26 and 28 accommodate the introduction of pipe sections P1 and P2 into bore 30. Bore 30 has a uniform inner diameter D2. Inner diameter D2 is in the range of 0.005 inch to 0.030 inch greater than the outer diameter D1 of the pipe sections to be joined. The wall thickness of cylinder 24 varies, along its length as will be explained below. However, it should be noted at this point, that the wall thickness, at midpoint M, is at its greatest. The wall thickness at midpoint M will be equal to the wall thicknesses of pipe sections P1 and P2, up to a maximum of 0.300". Connecting sleeve 12 has a defined overall length L1. Length L1 is approximately two (2) times than the outer diameter D1 of the pipe that it is connecting. For example, if outer diameter D1 of the pipe is 6 inches, the overall length L1 of connecting sleeve will be approximately 12 inches.

As stated above, the thickness of cylinder 24 varies along its length. The outer diameter of the connecting sleeves decrease from a point approximately one inch to each side of midpoint M toward the respective open ends 26 and 28, resulting in diverging tapers T1 and T2. Tapers T1 and T2 are approximately 1¼° tapers. Each taper extends out the respective open ends of the cylinder so as to reduce the wall thicknesses W2 and W3 at respective open ends. The wall thicknesses W2 and W3 are approximately 40% of the wall thickness at midpoint M. It will be appreciated, however, that the amount of taper may vary according to the ductility of the metal used to make connecting sleeve 12. An annular step 32 is formed on the inside surface 34 of sleeve 24, for example, by machining. The height of step 32 is equal to the wall thickness W1 of the pipe sections to be connected. The width of step 32 may vary. Step 32 is intended to center sleeve 12 equally over the resulting joint. It should be noted that step 32 can be omitted in sleeves designed for repair purposes. A first annular relief 36 is machined into outer surface 25 of the cylinder adjacent the start of taper T1. A second annular relief 38 is machined into outer surface 25 of the cylinder adjacent the start of taper T2. The respective reliefs 36 and 38 are machined to a depth of approximately one-third (⅓) the thickness of the cylinder at midpoint M. The respective reliefs 36 and 38 allow compression of cylinder 24 under the force of the draw sleeves as will be explained in greater detail below.

FIGS. 2 and 3 illustrate optional internal seal arrangements. A plurality of seal seats 40–46 are machined into the inner surface 34 of the cylinder 24. Each of the respective seats is machined to accommodate an "O" ring 50–56 (see FIG. 2). Although four optional "O" ring seals are shown in the illustrated embodiment, it will be appreciated that, in most applications, the metal-to-metal seal formed by the compression of the connecting sleeve against the pipe is sufficient to prevent any leakage. If the optional seals are employed inside the connecting sleeve, they are located within the inner diameter of the respective tapers T1 and T2 at a point between the midpoint of the taper and the thickest part of the taper number of seals may vary depending upon the application.

Figure 4A:
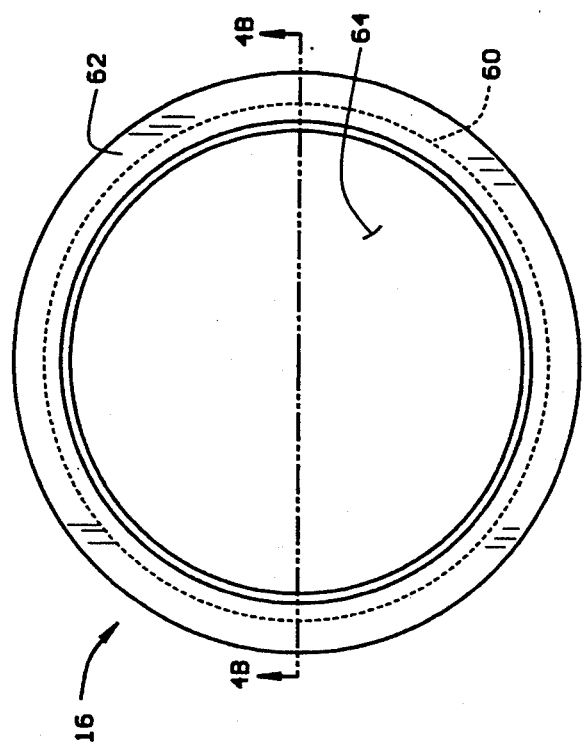
FIG. 4A is an end view of one embodiment of the draw sleeve.
Figure 4B:
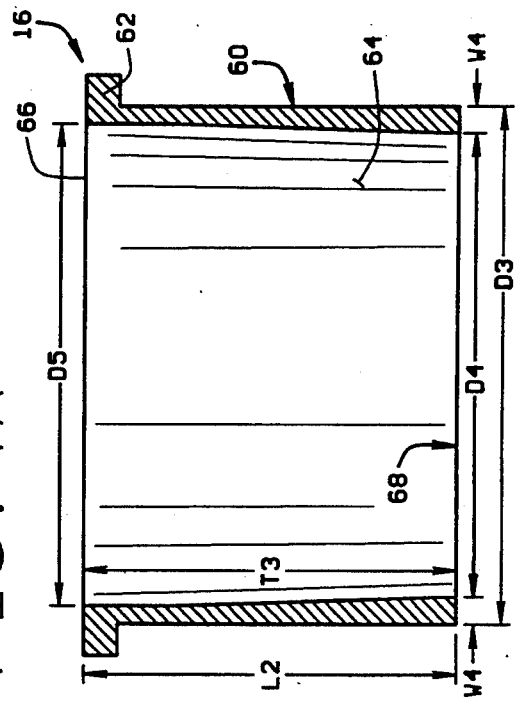
FIG. 4B is a cross-sectional view of the sleeve, taken along line 4B—4B of FIG. 4A.

The draw sleeve elements of the present invention, are best illustrated in FIGS. 2, 4A, and 4B, and will now be described in greater detail. Draw sleeve 16, with draw sleeve 14 being identical thereto, has a generally cylindrical wall 60 with an intregal shoulder 62 formed at a first end. Shoulder 62 forms a part of a bolting flange means to be described hereinafter. Wall 60, as well as integral flange 62, are machined from a higher tensile strength steel than that used to make connecting sleeve 12. Wall 60, as well as flange 62, define an internal, annular bore 64 with a first open end 66 and a second open end 68. Draw sleeve 16 has a overall length L2 approximately 45% of overall length L1 of connecting sleeve 12. The outer diameter D3 of wall 60 is uniform and is equal to the major diameter of the connecting sleeve plus 2 (two) times the wall thickness at point M before taper T1. The inner diameter D4 at open end 68 is less than the inner diameter D5 at open end 66. This results in an increase in wall thickness W4 at open end 68 with an internal taper T3. Taper T3 is approximately 1¼°, the same as the external taper of the connecting sleeve. The taper T3 runs out in a direction opposite to the run out of the external taper of the connecting sleeve, i.e. taper T3 is complementary to the external taper of the connecting sleeve. It will be appreciated, however, that the inner diameter D4 at open end 66 is approximately 0.5% less than the corresponding outer diameter of the connecting sleeve at the beginning of taper T1 near the midpoint M. For example, if the outer diameter of the connecting sleeve at the start of taper T1 is 6 inches, then the corresponding inner diameter D5 at open end 66 will be approximately 5.970 inches and will run out at the same 1¼° taper. This undersizing of the inner diameter of the draw sleeve relative to the outer diameter of the connecting sleeve at the beginning of the taper is intended to force the compression of the connecting sleeve wall as the draw sleeve is drawn over the connecting sleeve as will be explained below.

Figure 5A:
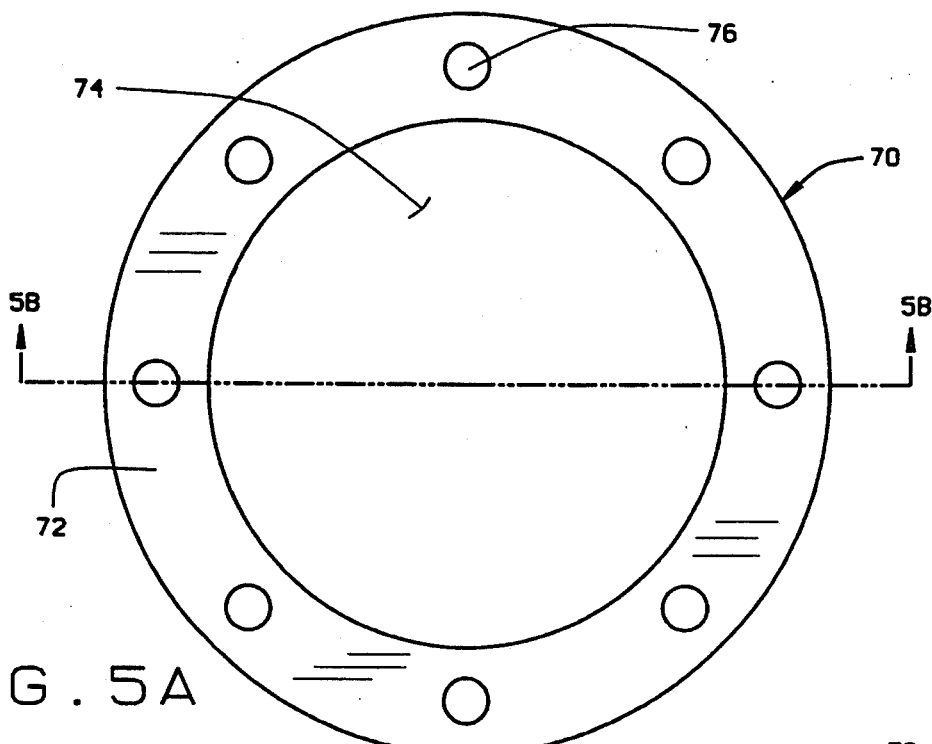
FIG. 5A is a top plan view of one embodiment of a bolting flange collar of the coupling assembly.
Figure 5B:
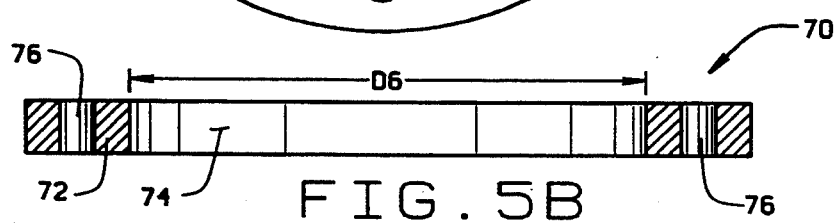
FIG. 5B is a cross-sectional view of the collar, taken across line 5B—5B of FIG. 5A.
Figure 6A:
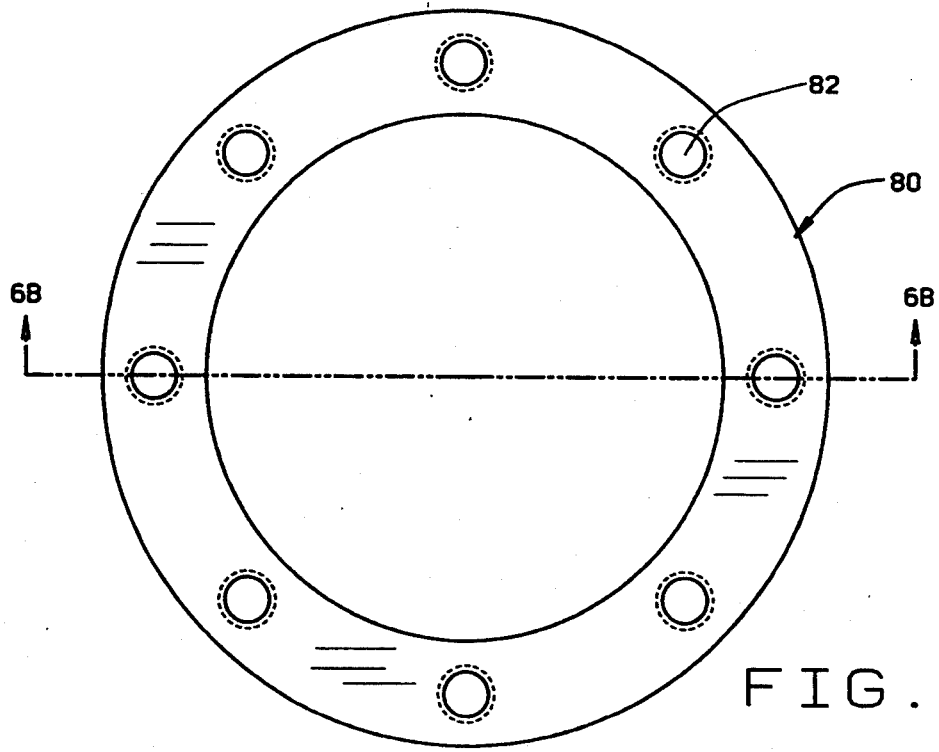
FIG. 6A is an end view of another embodiment of the bolting flange collar of the coupling assembly.
Figure 6B:
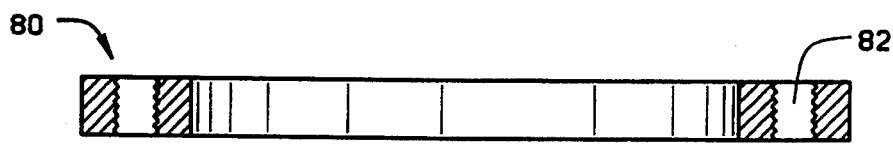
FIG. 6B is a cross-sectional view of the collar, taken across line 6B—6B of FIG. 6A.

FIGS. 5A and 5B illustrate one embodiment of a bolting flange collar, indicated by reference numeral 70. Collar 70, together with shoulder 62, form a flange means to accommodate draw bolts as will now be explained. Collar 70 has a flat circular body 72 formed of high tensile strength, machined steel. Body 72 defines an annular bore 74. The inner diameter D6 of bore 74 is approximately 0.060 inch greater than the outer diameter D3 of draw sleeve wall 60, allowing collar 70 to slide over the draw sleeve and abut shoulder 62. The outer diameter of collar 70, as well as the thickness of body 72, can be varied according to the application of the assembly. A plurality of evenly spaced bolt holes 76 are formed through body 72 to accommodate the insertion of bolts 22 or other appropriate tightening means (FIG. 1). It will be appreciated that bolts 22 can be conventional nut and bolt assemblies, as shown. FIGS. 6A and 6B, however, illustrate an alternative embodiment for a bolting flange collar, indicated generally by reference numeral 80. Collar 80 is identical to collar 70, with one notable exception. Collar 80 has a plurality of threaded holes 82 formed therethrough to accommodate the insertion of a threaded bolt (not shown). This arrangement eliminates a nut.

Figure 7A:
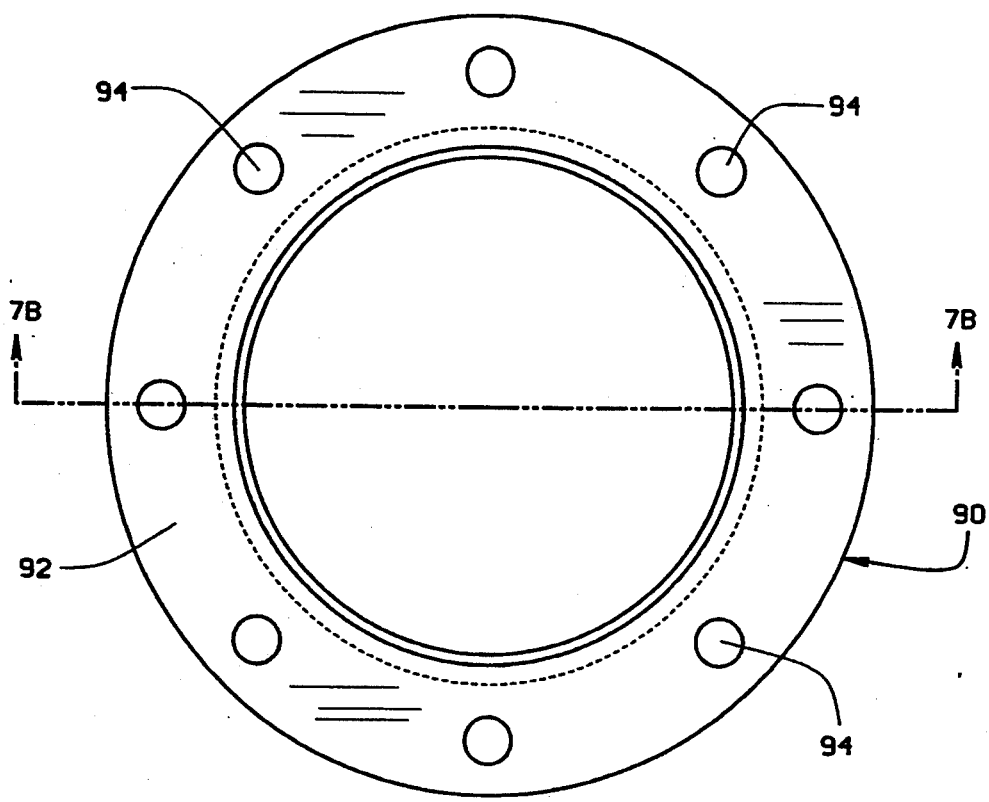
FIG. 7A is an end view of an alternative embodiment of the draw sleeve of the coupling assembly.
Figure 7B:
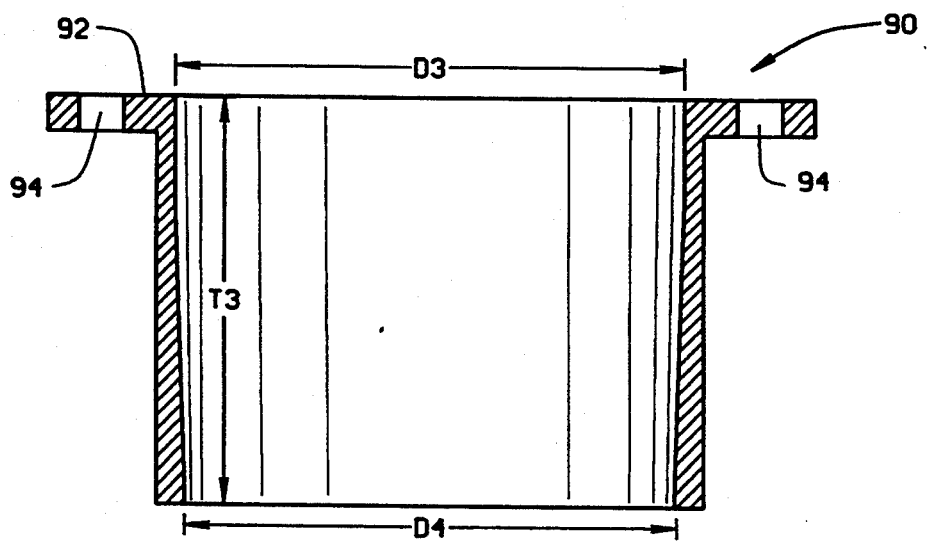
FIG. 7B s a cross-sectional view thereof, taken along lines 7B—7B of FIG. 7A.

FIGS. 7A and 7B illustrate an alternative embodiment of a draw sleeve element of the present invention, indicated generally by reference numeral 90. As illustrated, the general construction and configuration of draw sleeve 90 is the same as that of draw sleeve 16, previously described. However, draw sleeve 90 has an alternative bolting flange means. It will be noted, in FIG. 2 that the respective internal tapers of the draw sleeves and the respective external tapers on the connecting sleeve run in opposite directions. Draw sleeve 90 has a radial flange 92 in lieu of a shoulder 62 and collar 70, as shown in FIGS. 4A and 4B. Flange 92 has a plurality of evenly spaced holes 94 formed therethrough to accommodate the insertion of a conventional nut and bolt assembly. It should be noted the holes 94 can be threaded to accommodate threaded bolts (not shown).

In use, one each of the pair of opposed draw sleeves is slipped over an end of the sections of pipe to be connected. The bolting flange means is positioned adjacent the respective pipe openings. The connecting sleeve is put in place by moving the two draw sleeves away from the pipe ends. The pipe ends are inserted into the open ends of the connecting sleeve until they abut the step in the center of the internal bore. The draw sleeves are moved toward each other over the tapered ends of the draw sleeve. Bolt holes in the opposed bolting flanges are aligned and bolts inserted through opposed holes. The draw sleeves are drawn toward each other by tightening the bolts inserted through the respective, bolting flange means. As the draw sleeves are drawn toward each other, the respective internal tapers of the draw sleeves mate with the respective adjacent and complementary external, tapers of the connecting sleeve causing compression of the connecting sleeve ends. The reliefs machined in the external surface of the connecting sleeve wall facilitate compression. The compression of the connecting sleeve causes the connecting sleeve to adhere to the external surface of the pipe sections creating a tight friction fit. As stated above, optional "O" ring seals may be used, particularly in applications where there is substantially greater tolerance between the connecting sleeve and the pipe sections. However, the "O" ring seals are not necessary to form a proper friction fit.

It will be appreciated by those skilled in the art that various changes and modifications may be made in the invention without departing from the scope of the appended claims. For example, the inner diameter of the connecting sleeve may be reduced at the respective open ends of the connecting sleeve to allow for a pressed fit of the connecting sleeve on the pipe sections. Furthermore, the sleeve can be tack welded to the outer surface of a first section of pipe prior to connection to a second section of pipe to secure the assembly in place for alignment before tightening the draw bolts. In view of such changes and modifications, the foregoing description and accompanying drawings are intended to be illustrative only and should not be construed in a limiting sense.

I claim:

1. A friction sealed coupling assembly for joining sections of pipe comprising:
    a circumferentially continuous connecting sleeve disposed to slide over ends of the pipe sections to be joined, said connecting sleeve having a uniform inner diameter and an outer surface which tapers from the center of the outer surface toward each end of the sleeve so to form first and second diverging external tapers and reduced thicknesses, said first and second diverging tapers having a same degree of taper;
    a first draw sleeve fitting onto one end of said connecting sleeve over said first external taper, said first draw sleeve having a first and a second open end, a uniform outer diameter, and an internal bore which tapers toward said second open end, said internal taper having a same degree of taper as said first external taper, said internal taper and said first external taper increasing in diameter in the same direction;
    a second draw sleeve fitting onto the opposite end of said connecting sleeve over said second external taper, said second draw sleeve also having a first and a second open end, a uniform outer diameter, and an internal bore which tapers toward said second open end, said internal taper having a same degree of taper as said second external taper, said internal taper and said second external taper increasing in diameter in the same direction;
    means for drawing said first and second draw sleeves together to compress said connecting sleeve against the pipe sections.

2. The friction sealed coupling of claim 1 wherein the overall length of said connecting sleeve is approximately two times an outer diameter of the pipe section to be connected.

3. The friction sealed coupling of claim 1 wherein the length of each said draw sleeve is approximately 45% of the overall length of said connecting sleeve.

4. The friction sealed coupling assembly of claim 1 wherein each said degree of taper is approximately 1½ degrees.

5. A friction sealed coupling assembly for joining sections of pipe comprising:
    a circumferentially continuous connecting sleeve having an elongated cylindrical wall defining an internal bore, said bore having a uniform inner diameter and a first and a second open end formed therein to accommodate the insertion of sections of pipe, said cylindrical wall having an external diameter that decreases from a midpoint of said cylindrical wall out to said first open end forming a first external taper having a decreasing wall thickness and an external diameter that decreases from said midpoint out to said second open end forming a second external taper having a decreasing wall thickness, said first and second external tapers having a 1½ degree of taper;

a first draw sleeve at said first external taper of said connecting sleeve, said first draw sleeve having a cylindrical wall defining an internal bore with first and second open ends, a flange means at said first open end, said internal bore having an inner diameter that decreases from adjacent said first open end to said second open end creating an increasing wall thickness and an internal taper having a degree of taper the same as the degree of taper of said first external taper on said connecting sleeve, said internal taper being in a complementary disposition to said first external taper;

a second draw sleeve at said second external taper of said connecting sleeve, said second draw sleeve having a cylindrical wall defining an internal bore with first and second open ends, a flange means at said first open end, said internal bore having an inner diameter that decreases from adjacent said first open end to said second open end creating an increasing wall thickness and an internal taper, said internal taper having a degree of taper the same as the degree of taper of said second external taper on said connecting sleeve, said internal taper in a complementary disposition to said second external taper;

tightening means between said respective flange means disposed to draw said draw sleeves toward each other upon tightening whereby the respective internal tapers of the respective draw sleeves compress the respective external tapers of the connecting sleeve, pressing said respective decreasing wall thicknesses of said connecting sleeve and adhering said connecting sleeve to the sections of pipe creating a tight friction seal between said connecting sleeve and said ends of the pipe sections.

6. The friction sealed of coupling assembly of claim 5 wherein said cylindrical wall of said connecting sleeve has at least one relief cut formed therein.

7. The friction sealed coupling assembly of claim 5 wherein said internal bore of said connecting sleeve has at least one "O" ring seal therein.

8. The friction sealed coupling assembly of claim 5 wherein said flange means further includes a shoulder integrally formed on said cylindrical wall and a connecting flange around said cylindrical wall and abutting said shoulder.

9. The friction sealed coupling assembly of claim 5 wherein said flange means further includes an integral radial flange formed from said wall.

10. The friction sealed coupling assembly of claim 5 wherein said internal bore of said connecting sleeve has a step formed therein.

11. The friction sealed coupling of claim 5 wherein said inner diameter of said internal bore of said connecting sleeve is approximately 0.005 inches to approximately 0.030 inch greater than an outer diameter of the pipe sections to be connected.

12. The friction sealed coupling of claim 5 wherein said inner diameter of each said draw sleeve approximately 0.5% less than the corresponding outer diameter of said connecting sleeve at the beginning of each said respective taper adjacent the midpoint.

13. A method of connecting, end-to-end, two sections of pipe comprising the steps of:

providing a first draw sleeve;

sliding said first draw sleeve over and open end of a first section of pipe, said draw sleeve having a cylindrical wall defining an internal bore and a first open end and a second open end, a flange means at said first open end, said flange means having a plurality of holes formed therethrough for the insertion of a tightening means, said cylindrical wall having a uniform outer diameter, said bore having an internal diameter that decreases from said first open end to said second open end creating a taper therein;

providing a second draw sleeve;

sliding said second draw sleeve over an open end of a second section of pipe, said draw sleeve having a cylindrical wall defining an internal bore and a first open end and a second open end, a flange means at said first open end, said flange means having a plurality of holes formed therethrough for the insertion of a tightening means, said cylindrical wall having a uniform outer diameter, said bore having an internal diameter that decreases from said first open end to said second open end and creating a taper therein;

positioning said respective draw sleeves back from the open ends of the respective pipe sections;

providing a circumferentially continuous connecting sleeve;

inserting the open end of the first pipe section into a first open end of said connecting sleeve;

inserting the open end of the second pipe section into a second open end of said connecting sleeve, said connecting sleeve having a cylindrical wall defining an internal bore and said first and second open ends, said bore having a uniform diameter from said first open end to said second open end, said cylindrical wall having a first and second diverging external tapers that begin adjacent a midpoint on said cylindrical wall and extend to said respective open ends thereby decreasing a wall thickness from said midpoint to said open ends, said first diverging taper having a degree of taper the same as a degree of taper of said internal taper of said first draw sleeve, said second diverging taper having a degree of taper the same as a degree of taper of said internal taper of said second draw sleeve;

sliding said first draw sleeve over said first open end of said connecting sleeve, said first diverging taper and said internal taper of said first draw sleeve being in a complementary arrangement;

sliding said second draw sleeve over said second open end of said connecting sleeve, said second diverging taper and said internal taper of said second draw sleeve being in a complementary arrangement;

providing a plurality of tightening means;

inserting said plurality of tightening means through said holes in said flange means on said first draw sleeve and through corresponding, aligned holes formed in said flange means on said second draw sleeve;

drawing said first and second draw sleeves toward each other by said step of tightening; thereby compressing said respective ends of said connecting sleeve with said respective draw sleeves so that said connecting sleeve cylindrical wall adheres to the respective ends of said first and second pipe sections forming a tight friction seal.

14. The method of claim 13 wherein each said degree of taper is approximately 1½°.

* * * * *